Feb. 10, 1953 — W. U. BOEDEKER — 2,627,846
FLUID PRESSURE IMPACT DEVICE
Filed May 24, 1948

Inventor
Walter U. Boedeker
By Frank H. Hubbard
Attorney

Patented Feb. 10, 1953

2,627,846

UNITED STATES PATENT OFFICE 2,627,846

FLUID PRESSURE IMPACT DEVICE

Walter U. Boedeker, Whitefish Bay, Wis., assignor to Cutler-Hammer, Inc., Milwaukee, Wis., a corporation of Delaware Application May 24, 1948, Serial No. 28,935

4 Claims. (Cl. 121—13)

This invention relates to fluid pressure operated impact devices.

The invention is applicable to both pneumatic and hydraulic devices of various types and sizes. For example, the invention has been embodied to great advantage in a pneumatic device comprising a cylinder of approximately one inch diameter having a spring retracted piston with a stroke of approximately six inches, the cylinder being supplied with air at about eighty pounds pressure, and the device being capable of delivering impact blows of about five thousand pounds. Such a device has a wide field of uses and it is highly important that the means thereof relied upon for transient restraint and sudden release of the piston be rugged and durable and be capable of functioning repeatedly with a minimum of attention. This is particularly true where a number of such devices are grouped to operate together on a single work piece and where disablement of one device disables the entire group of devices. While various forms of mechanical latching means have been provided for the pistons of such devices all seem to be lacking in one or more of the aforeindicated important characteristics and also to present problems in obtaining as well as in maintaining desired adjustments of the force of impact blows.

An object of the present invention is to provide an impact device wherein the means to restrain and abruptly release the piston has all the desired characteristics aforeindicated including simple and easy adjustment of the force of impact blows.

Another object is to provide piston restraining means which affords release of the piston with abruptness and without subsequent frictional drag on the plunger.

Another object is to provide for restraint and release of the piston by selective preponderation of opposing forces, one force being the fluid pressure within the device and the other a magnetic force effective only in a given position of the piston.

Another object is to provide magnetic restraining means for the piston which will not interfere with close grouping of a number of devices when desired.

Other objects and advantages of the invention will hereinafter appear.

An embodiment of the invention is illustrated in the accompanying drawing which will now be described, it being understood that the embodiment illustrated is susceptible of various modifications without departing from the scope of the appended claims.

Figure 1:
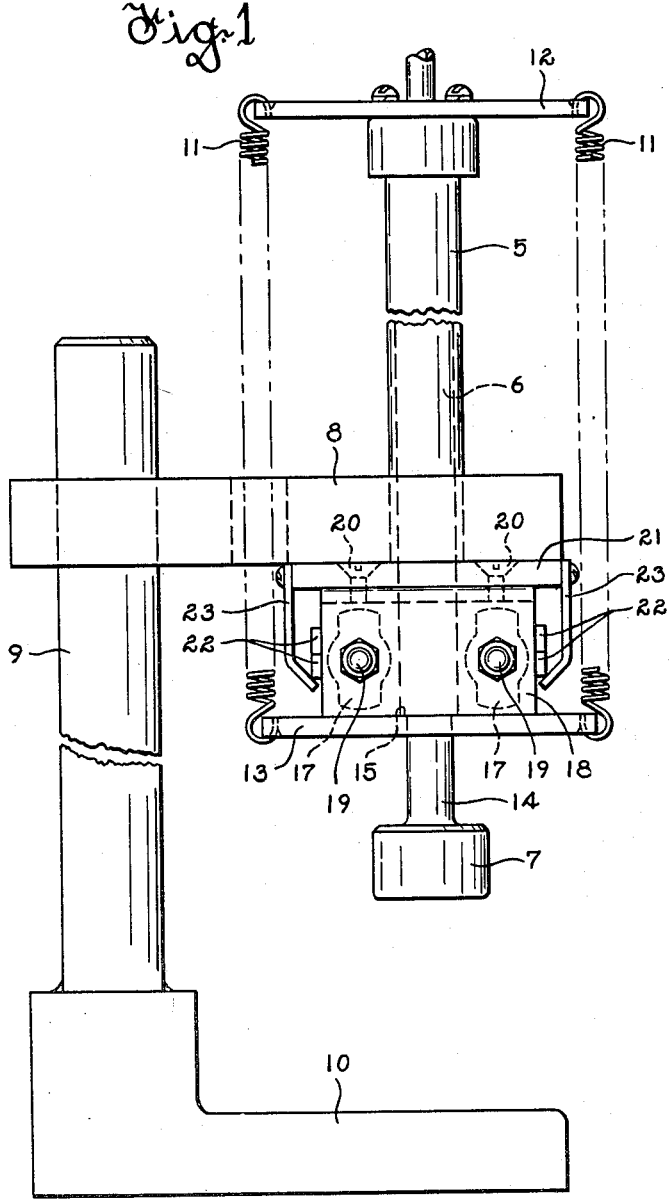
Figure 1 is a side elevational view of a pneumatic impact device.

The device shown in the drawing is of the type above mentioned as an example and comprises and air cylinder 5 having a piston 6 carrying a hammer-head 7. The cylinder 5 is supported on an arm 8 of a stand 9 having its base 10 underlying the hammer-head 7, it, of course, being understood that the arm 8 may be attached to the cylinder in any preferred manner. Air under pressure is admitted to the cylinder 5 to drive the piston 6 and hammer-head 7 downwardly toward such workpiece as may be placed on the base 10 of the stand 9, the piston and hammer-head being retractable by springs 11 when the cylinder is permitted to exhaust the air charge thereof. Any suitable means such as the usual three way valve may be employed to supply air to the cylinder 5 and to permit the cylinder to exhaust its air charge.

In the device shown the springs 11 which are of the coil type are fixed to and depend from the ends of a cross bar 12 bolted or otherwise suitably secured to the top of the cylinder 5, said springs having their lower extremities attached to the ends of a cross bar 13 on the piston 6 and arm 8 of the stand having an opening therein to permit one spring to pass through it with suitable clearance. Cross bar 13 is shown as mounted on the extension 14 of piston 6, which extension carries the hammer-head and is of reduced diameter, and said cross bar bears against a shoulder 15 of the piston provided at its juncture with extension 14. For reasons which will hereinafter appear the bar 13 is fitted loosely on the extension of the piston, thus to be free for some tilting when in engagement with shoulder 15.

Figure 2:
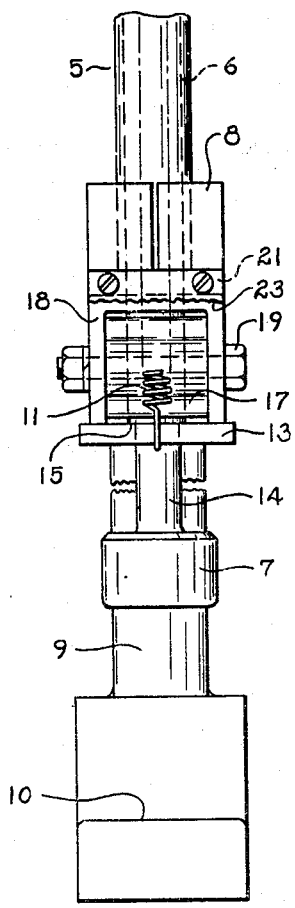
Fig. 2 is a front elevational view of the device shown in Fig. 1.

Cross bar 13 is formed of magnetic material and is utilized as an armature for a pair of stationarily mounted permanent magnets 17. The magnets 17 are shown as mounted in a spaced and parallel relation with the piston 6 disposed therebetween, said magnets being supported in a magnet frame 18. The magnet frame 18 is shown (Fig. 2) as being of inverted U-shape to receive therein at right angles to its depending sides the magnets 17 supported by through bolts 19. The magnet frame is secured as by screws 20 to a non-magnetic plate 21, preferably brass, which in turn is suitably secured to the under side of the stand arm 8 carrying the cylinder 5. As best shown in Fig. 2, the cross bar 13 on the piston is of sufficient width to bridge the bottom edges of the spaced depending sides of the magnet frame 18 containing the permanent magnets, and assuming air to be exhausted from the cylinder 5 said cross bar is drawn by springs 11 into engagement with said edges of the magnet frame. Here it is to be noted that the aforementioned freedom of bar 13 to tilt insures good contact between said bar and the edges of the magnet frame to be bridged thereby. With this arrangement the two magnets individually exert holding pulls on the piston through the cross bar 13, said magnets having separate magnetic circuits through said cross bar.

Thus when air is admitted to cylinder 5 piston 6 will be magnetically restrained against movement until the air pressure within the cylinder builds up to a predetermined value preponderating the opposing magnetic pull on the piston. Then when the air pressure preponderates the piston will make a quick breakaway, moving downwardly at a rapid rate and causing the hammer-head 7 to deliver a forceful impact blow.

Permanent magnets of small physical dimensions have been found effective for devices affording impact blows up to about five thousand pounds and such magnets will function satisfactorily and without attention over long periods, being in nowise adversely affected by the shocks to which they are subjected. Any suitable magnets may, of course, be employed, "Alnico" magnets having been found very advantageous in practice.

With magnets employed as aforediscussed said magnets afford a medium for regulating and adjusting the force of blows in a very simple and expeditious manner, namely by shunting the magnets to varying degrees. As will be understood, such shunting of the magnets may be accomplished in various ways, the provision shown being perhaps somewhat crude but quite practical. In the device shown shunting is effected by employing a selected number of magnetic bars 22 of suitable cross section, to bridge the vertical edges of the depending sides of the magnetic frame 18. As shown the magnet frame is provided at opposite ends with a number of such bars 22 supported by brackets or clips 23, preferably of brass, which are fixed to and depend from opposite ends of the non-magnetic plate 21. While the bars 22 are magnetically attracted to the magnet frame they tend to slip downwardly under shock and the brackets or clips 23 are provided to limit their slip downwardly. As will be apparent, the shunting bars or rods may be readily inserted in and withdrawn from the brackets or clips, and as will be understood the magnetic shunts afforded thereby lessen the restraining effect of the magnets to a degree varying with the shunting value of the bars employed.

What I claim as new and desire to secure by Letters Patent is:

1. The combination with a fluid pressure operated impact device comprising a support for holding an article to be subjected to an impact blow and a piston member dependent upon fluid pressure for movement toward said support, said piston member including a hammer-head for striking said article, of means for materially augmenting the impact blow of said device comprising magnetic restraining means mounted on said device for affording in a given position of said piston member a restraining pull opposing fluid pressure operation of said piston toward said support but permitting quick breakaway of said piston member upon adequate building up of the fluid pressure exerted thereon.

2. The combination with a fluid pressure operated impact device comprising a support and a piston member movable under fluid pressure toward said support for imparting an impact blow to an article positioned therebetween, of means for materially augmenting the impact blow of said device comprising a magnet mounted on said device and a member formed of magnetic material mounted on said piston member for engagement with said magnet in a given position of said piston member to restrain said piston member against movement until said fluid pressure overcomes the attractive force of said magnet.

3. In combination with a fluid pressure operated impact device wherein a piston is movable under fluid pressure for imparting an impact blow to an object, means for increasing the force of the blow delivered by said piston comprising magnetic restraining means mounted on said device, and a cross-bar formed of magnetic material mounted on said piston for engagement with said magnetic restraining means in a given position of said piston but permitting quick breakaway of said piston upon adequate building up of the fluid pressure exerted thereon, whereby the force of the impact blow delivered by said device can be increased without variation in the size of said device or the fluid pressure available therefor.

4. In combination with a fluid pressure operated impact device comprising a stand having an arm and a base and a piston positioned for movement by fluid pressure in a cylinder mounted on said arm for imparting an impact blow to an object positioned between said arm and said base, means for materially increasing the force of the blow delivered by said piston comprising a pair of spaced permanent magnets mounted on said arm for reciprocation of said piston therebetween and a magnetic cross bar mounted on said piston constituting armatures for said magnets, said magnets through the magnetic pull exerted thereby on said cross bar restraining said piston in a given position subject to quick breakaway upon sufficient building up of the fluid pressure within said cylinder whereby the force of the impact blow delivered by said piston will be determined by the attractive force of said magnets on said cross bar.

WALTER U. BOEDEKER.

REFERENCES CITED

The following references are of record in the file of this patent:

UNITED STATES PATENTS

| Number | Name | Date |
|---|---|---|
| 692,217 | Sundh | Jan. 28, 1902 |
| 834,274 | Dewson | Oct. 30, 1906 |
| 974,267 | Hennessy et al. | Nov. 1, 1910 |
| 1,827,102 | Penn | Oct. 13, 1931 |
| 2,282,933 | Cahill | May 12, 1942 |
| 2,290,256 | Souter | July 21, 1942 |
| 2,310,504 | Aubert | Feb. 9, 1943 |
| 2,349,185 | Matulaitis | May 16, 1944 |
| 2,436,388 | Iavelli | Feb. 24, 1948 |